United States Patent
Jennings

(10) Patent No.: US 6,805,382 B2
(45) Date of Patent: Oct. 19, 2004

(54) ONE STROKE SOFT-LAND FLOWLINE CONNECTOR

(75) Inventor: Charles Edward Jennings, Houston, TX (US)

(73) Assignee: ABB Vetco Gray Inc., Houston, TX (US)

(*) Notice: Subject to any disclaimer, the term of this patent is extended or adjusted under 35 U.S.C. 154(b) by 125 days.

(21) Appl. No.: 10/091,843

(22) Filed: Mar. 6, 2002

(65) Prior Publication Data

US 2003/0168857 A1 Sep. 11, 2003

(51) Int. Cl.[7] ............................................. F16L 35/00
(52) U.S. Cl. ....................... 285/18; 285/322; 166/380; 166/341
(58) Field of Search ..................... 285/322, 18, 920, 285/24, 27; 166/341, 343, 380

(56) References Cited

U.S. PATENT DOCUMENTS

| | | | | |
|---|---|---|---|---|
| 3,675,713 A | * | 7/1972 | Watkins | 285/18 |
| 3,841,665 A | * | 10/1974 | Capot | 285/920 |
| 4,191,256 A | | 3/1980 | Croy et al. | |
| 4,453,745 A | * | 6/1984 | Nelson | 285/18 |
| 4,491,346 A | * | 1/1985 | Walker | 285/18 |
| 4,496,172 A | * | 1/1985 | Walker | 285/18 |
| 4,526,406 A | * | 7/1985 | Nelson | 285/18 |
| 4,592,426 A | * | 6/1986 | Neely | 285/920 |
| 4,632,432 A | * | 12/1986 | Reneau | 285/24 |
| 4,708,376 A | * | 11/1987 | Jennings et al. | 285/920 |
| 4,823,879 A | * | 4/1989 | Brammer et al. | 166/341 |
| 4,893,677 A | * | 1/1990 | Brammer et al. | 166/341 |
| 5,158,141 A | | 10/1992 | Saliger et al. | |
| 5,634,671 A | * | 6/1997 | Watkins | 285/18 |

* cited by examiner

Primary Examiner—David Bochna
(74) Attorney, Agent, or Firm—Bracewell & Patterson, L.L.P.

(57) ABSTRACT

A frame is used to land on a base and soft land a connector receptacle on the end of a flowline to a mandrel protruding from the base. After the frame lands on the base, the frame and the receptacle are pushed toward the base, which causes frame latching members to latch the frame to the base. The frame holds the base and the receptacle is still above the mandrel. The frame and receptacle are pushed further towards the base and the connector receptacle abuts the mandrel. The connector receptacle moves relative to the frame as the frame is pushed closer to the base, which causes an actuator on the frame to move dogs on the receptacle to engage the mandrel and lock the receptacle to the mandrel. The frame can move away from the mandrel and continue to be latched to the base while disengaging the receptacle from the mandrel.

23 Claims, 6 Drawing Sheets

Fig. 4
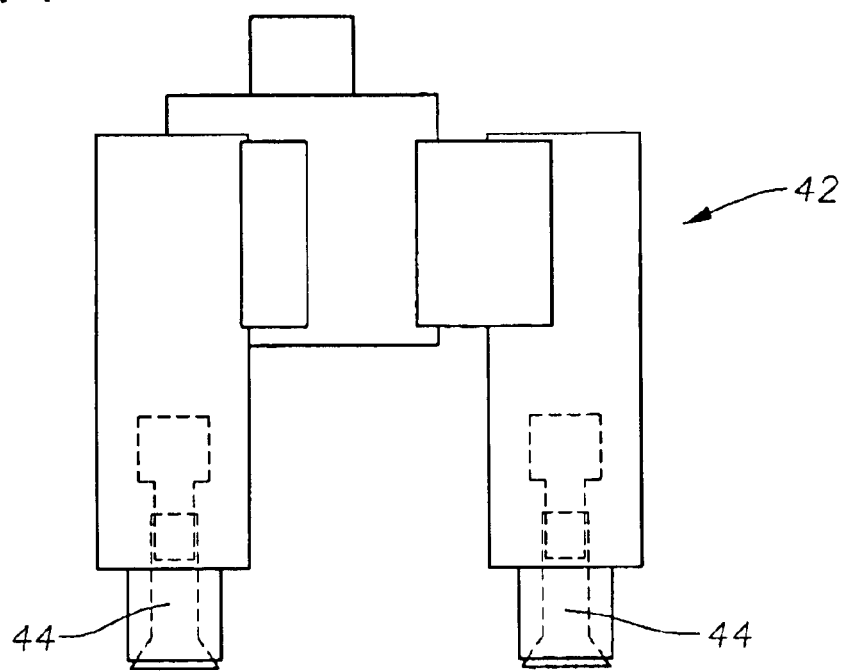
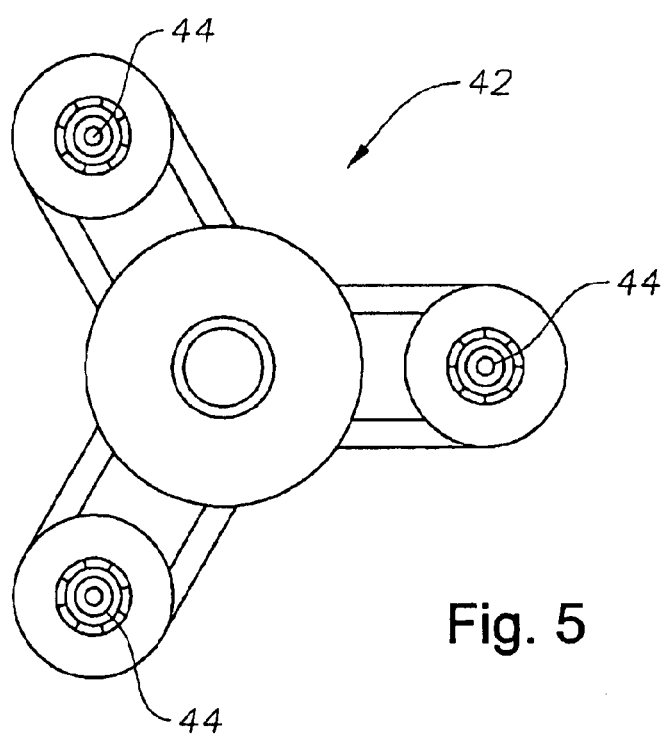
Fig. 5

ONE STROKE SOFT-LAND FLOWLINE CONNECTOR

BACKGROUND OF THE INVENTION

1. Field of the Invention

The present invention relates generally to subsea well installations, more specifically, to a flowline apparatus for connecting a flowline to a subsea well installation.

2. Background of the Prior Art

Different structures are placed on or buried in the seabed for subsea oil and gas production operations. The structures have mandrels or tubular members to connect to flowlines. Flowlines connect these structures and are typically installed after the structures were placed at the seabed. The lines or piping systems with hubs or connectors at the ends are lowered to the seabed for installation via wire rope guidelines or other running strings such as pipe. The connectors are consequently hard landed on either the subsea mandrel or support structures, and with the aid of remote operated vehicles (ROV) or tools, are locked to subsea flowline mandrels. The mandrels are typically vertical so the flowline connectors lower down on top of them, but the mandrels can be horizontal. If the connector assemblies are landed fast or too hard on the subsea mandrels such that the landing force is not controlled, damage to the hubs and seals can occur.

Flowline connector assemblies are normally run subsea and landed over the subsea flowline mandrels with funnel up, funnel down, or frame and tool assemblies. Here the connector and mandrel are locked and sealed together. Previous assemblies required the ROV to perform numerous operations in order to engage locking members from the remotely run frame to the subsea base structure. Previous assemblies also required the ROV to perform numerous operations to engage locking members on the flowline connector, even after the frame has been secured to the subsea support structure.

BRIEF SUMMARY OF THE INVENTION

In a subsea well installation a subsea flowline with remotely operated connector receptacles is run from a surface vessel on wire rope, or other running strings. In this invention, the flowline and connector are run attached to a frame, which in turn is run on wire rope or pipe. In this case the connector is extended to the upward position relative to the frame, so that when the frame assembly lands and locks to a fixed porch or support plate below the subsea mandrel, the connector will not come in contact with the mandrel, but can be soft landed on the mandrel after the frame assembly is stroked halfway down, locking the frame to the porch or support plate. The fluorine connector receptacle will be positioned above the mandrel where the seal will be installed between the connector and mandrel with the ROV. The connector and frame assembly will then be lowered softly to the mandrel protruding from above the mandrel support porch with an axially stroking mechanism. For replacing the seal, the frame has locking members that allow the frame to be lifted to a partially open position that releases the receptacle mandrel without releasing the frame from the mandrel support. The connection is made by first landing the connector assembly on the mandrel base, then lowering the frame partially to lock the frame to the base, then lowering the frame completely to lock the connector receptacle to the mandrel, making a tight connection without exerting undue forces on the mandrel. The frame can then be raised partially, releasing the connector receptacle from the mandrel while the frame remains locked to the mandrel support, allowing the seal between the receptacle and the mandrel to be replaced without the necessity of re-aligning the connector.

The frame and the receptacle have locking mechanisms that are automatically actuated as the frame is advanced to the mandrel support. The ROV connecting this assembly to the rate mandrel and the mandrel support only needs to operate a lowering device in order to advance the frame to the mandrel support.

BRIEF DESCRIPTION OF THE DRAWINGS

FIG. 4 is a sectional side view of the running and actuation tool used in conjunction with the subsea flowline connector of FIG. 1.

FIG. 5 is a top view of a running and actuation tool of FIG. 4

DETAILED DESCRIPTION OF THE PREFERRED EMBODIMENT

Figure 1:
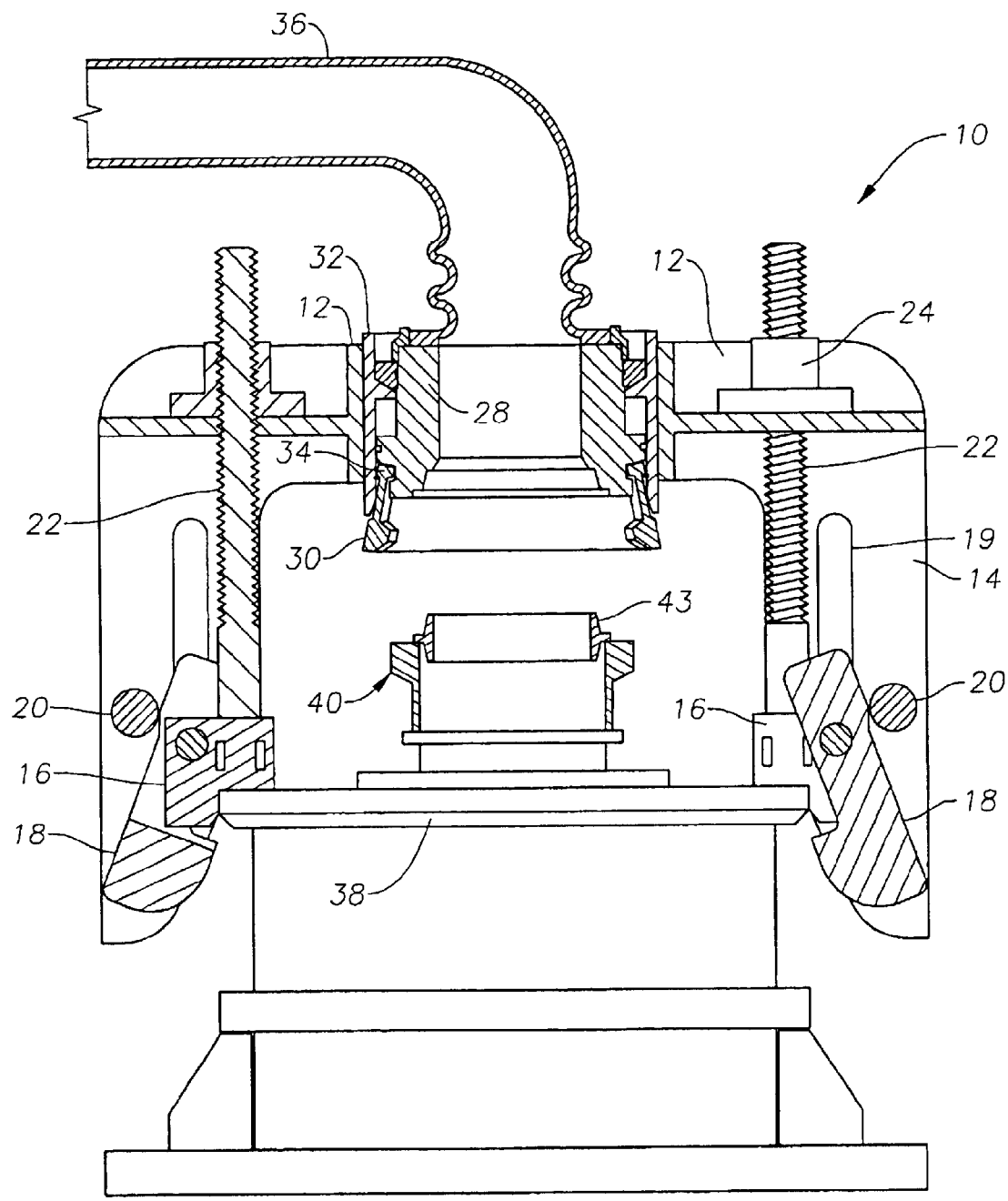
FIG. 1 is a sectional side view of a subsea flowline connector assembly constructed in accordance with this invention, the connector landed on a flowline support.
Figure 2:
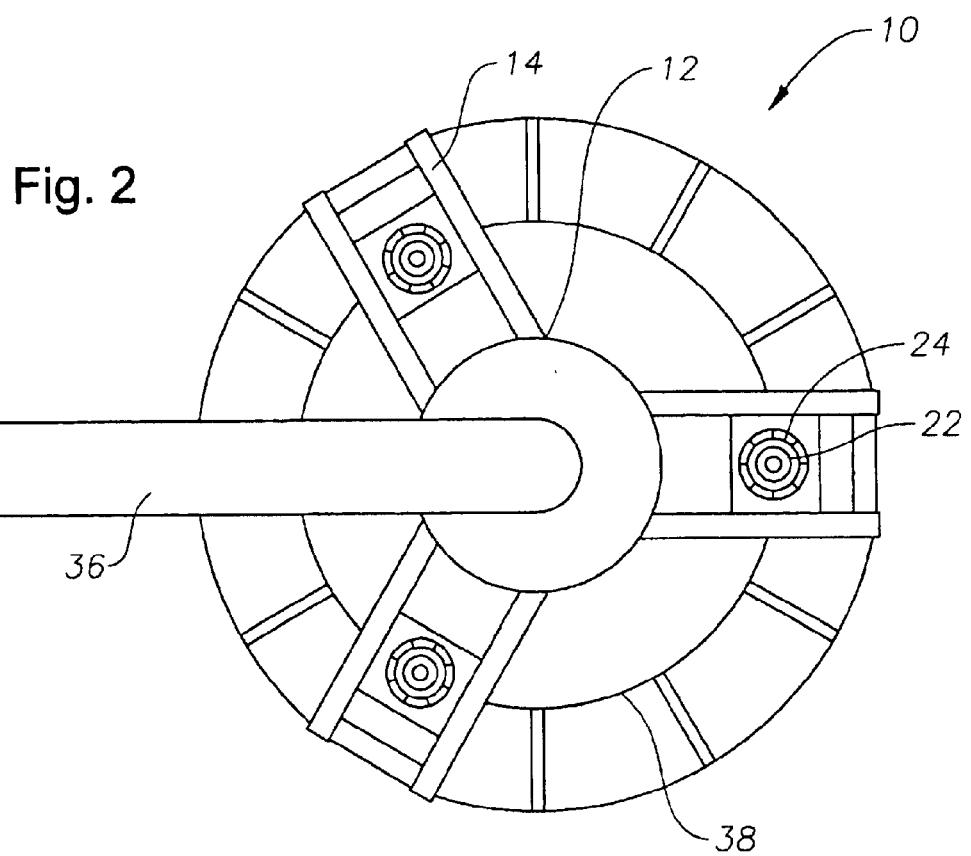
FIG. 2 is a top view of the subsea flowline connector assembly of FIG. 1.

Referring to FIG. 1, subsea flowline connector assembly 10 has a frame 12. In the preferred embodiment frame 12 is comprised of a plurality of arms 14 which are connected at an upper end as shown in FIG. 2. Frame 12 has landing bases 16 and lock mechanisms 18 at the lower ends of arm 14. Landing bases 16 are slidingly attached to arms 14 of frame 12. Actuator bars 20 are attached to frame 12 for movement therewith and positioned to engage lock mechanisms 18. In the preferred embodiment each lock mechanisms 18 is pivotally mounted to one of the bases 16, and actuator bars 20 are securely mounted in a hollow interior of each arm 14. Actuator bars 20 are mounted transverse to a longitudinal axis of frame 12. Lock mechanisms 18 have pivot pins that extend through longitudinal slots 19 in arms 14.

Jack screws 22 extend from an upper end of frame 12 and are rotatably secured in landing bases 16. The upper ends of jack screws 22 extend through jack nuts 24 rigidly attached to the upper surface of frame 12. In the preferred embodiment, each arm 14 has one of the landing bases 16 and one of the jack screws 22. Each jack screw 22 secures to landing base 16 and extends upward though an upper end of arm 14 through jack nut 24 attached to an upper surface of arm 14 as shown in FIG. 2. Jack screws 22 have polygonal upper ends.

Figure 7:
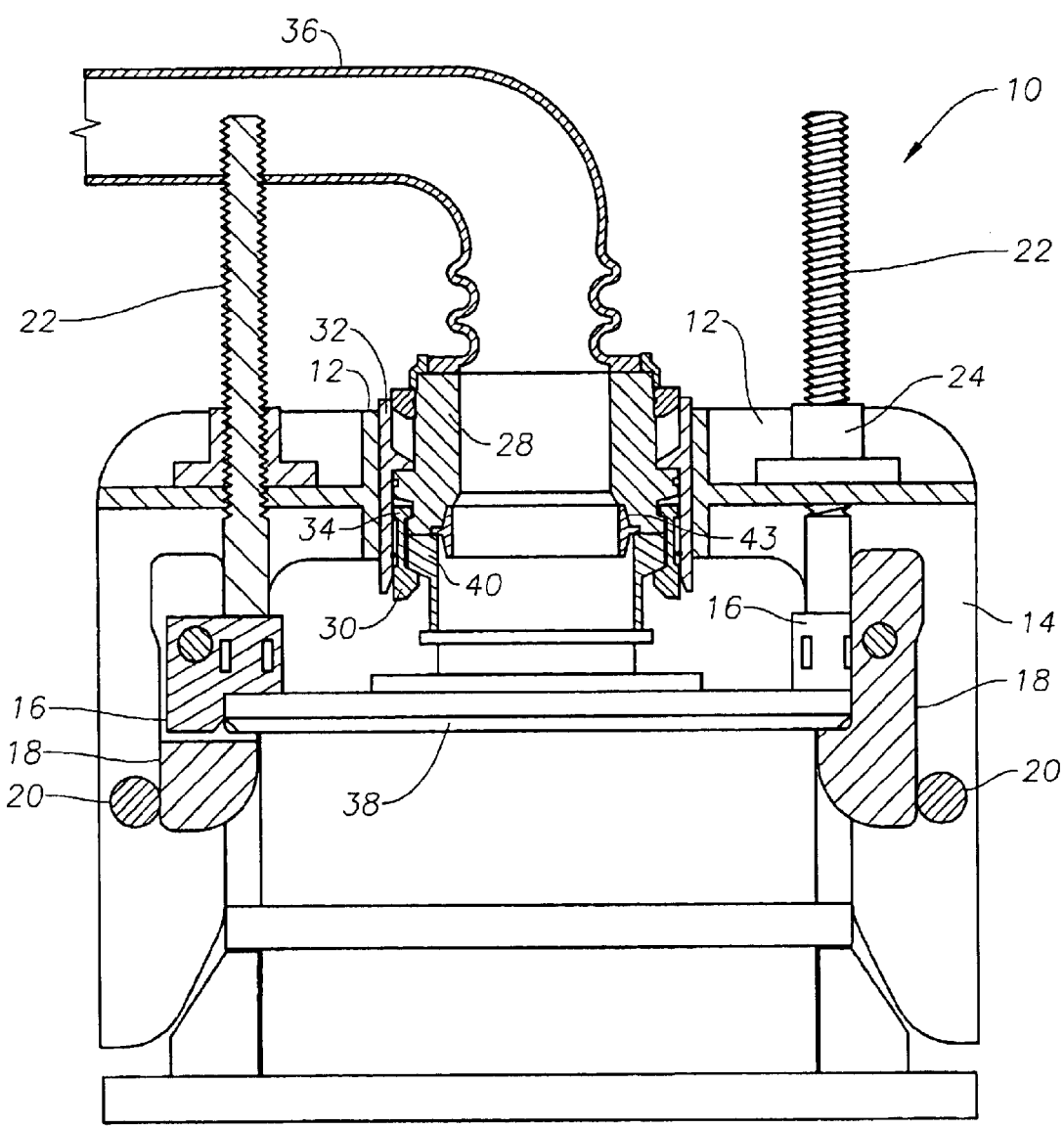
FIG. 7 is a sectional side view of the subsea flowline connector assembly of FIG. 1, the connector assembly frame being lowered completely and the connector's receptacle locked to the mandrel.

A cylindrical connector receptacle 28 is axially slidingly carried by frame 12. Connector receptacle 28 has mandrel dogs 30 pivotally carried by it. A locking sleeve 32 is fixed to frame 12 and surrounds connector receptacle 28. Frame 12 can stroke vertically relative to connector receptacle 28 over a limited range. Mandrel dogs 30 are pivotally positioned between locking sleeve 32 and connector receptacle 28 so that when connector receptacle 28 is at a lower position relative to sleeve 32, mandrel dogs 30 are in an expanded diameter position. As shown in FIG. 1, an internal ledge 34 in sleeve 32 contacts the lower side of the head or the upper end of each dog 30 and causes the lower ends to pivot outward, when connector receptacle 28 is in its lower position. When connector receptacle 28 moves to an upper position relative to locking sleeve 32, the lower ends of dogs 30 are pushed inward into a locked position as shown in FIG. 7. Connector receptacle 28 is attached to the end of a subsea flowline 36.

Figure 3:
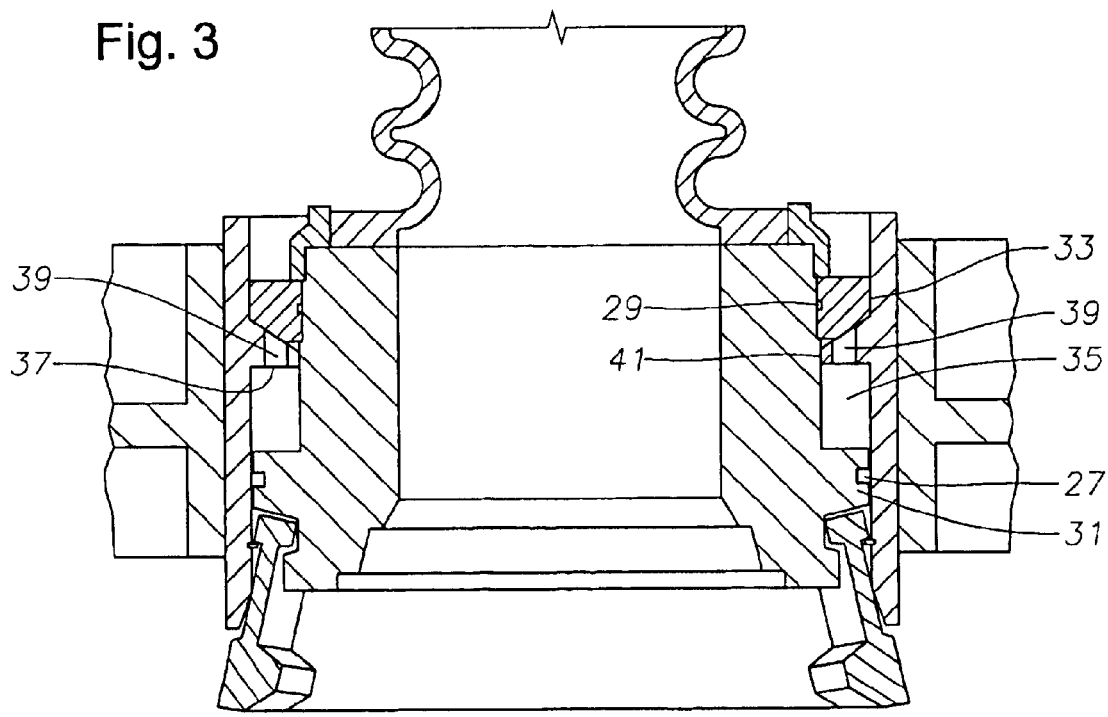
FIG. 3 is an enlarged partial view of the subsea flowline connector portion of the assembly of FIG. 1.

Referring to FIG. 3, connector receptacle 28 has enlarged bands 31 and 33 that are axially spaced apart and sealingly engage the inner diameter of sleeve 32. Bands 31 and 33 define a chamber 35 between them that is filled with a hydraulic fluid. A seal 27 located on the outer diameter of band 31. A seal 29 is located on the inner diameter of band 33. A flange 37 extends radially inward from sleeve 32 into sealing engagement with external wall of connector receptacle 28 between bands 31 and 33. The weight of connector receptacle 28 and the fluid trapped between seals 27 and 29 of bands 31 and 33 retains connector receptacle 28 in the lower position of FIG. 1 until frame 12 moves downward. Alternatively, a resistance to upward movement could be used.

Flange 37, having a seal 41, divides chamber 35 into upper and lower portions. One or more passages 39 with a spring biased check valve extends through flange 37 to allow fluid in the lower part of chamber 35 to flow to the upper part of chamber 35 only if sufficient downward weight on sleeve 32 is applied. In the preferred embodiment, the check valve is a spring biased double acting check valve. Hydraulic fluid in chamber 35 and passages 39 keep connector receptacle 28 in the lower position relative to sleeve 32 unless sufficient downward force is applied to sleeve 32 to create a sufficient reactive force from mandrel 40 to overcome the check valve in passage 39. The check valve in passage 39 freely allows flow from the upper portion of the chamber 35 to the lower portion when connector receptacle 28 is lifted from a mandrel 40.

Mandrel support 38 is a flat circular plate radially around and below mandrel 40. Mandrel 40 is a tubular member of smaller diameter than plate 38 and having a locking hub profile on its exterior. A metal seal ring 43 is carried in the hub rim of mandrel 40 for sealing to a lower rim of connector receptacle 28.

A running and actuation tool 42 is secured to jack screws 22 for both landing connector assembly 10 on the mandrel support 38 and raising and lowering connector receptacle 28 from the filly raised position of landing, to the partially raised position for maintenance, to the filly engaged position. In the preferred embodiment, tool 42 has a jack actuator 44 for each jack screw 22 as shown in FIG. 5 and FIG. 4. Each jack actuator 44 has a socket for fitting over the upper polygonal end of one of the jack screws 22. Jack actuators 44 grasp and rotate jack screws 22.

In operation, landing bases 16 of subsea flowline connector 10 land on the upper surface of mandrel support 38 with jack screws 22 in a fully extended position as shown in FIG. 1. In this position, locking mechanisms 18 are pivoted outward and connector receptacle 28 is spaced above mandrel 40. Bases 16 support frame 12 in the position shown in FIG. 1 with dogs 30 spaced above mandrel 40. As jack screws 22 are rotated relative to jack nuts 24 by using tool 42, frame 12 lowers from the position shown in FIG. 1. Actuator bars 20 move downward with frame 12 relative to bases 16 and locking mechanisms 18. This forces locking mechanisms 18 to pivot inward into a locked position, thus securing frame 12 to mandrel support 38 as shown in FIG. 6.

Figure 6:
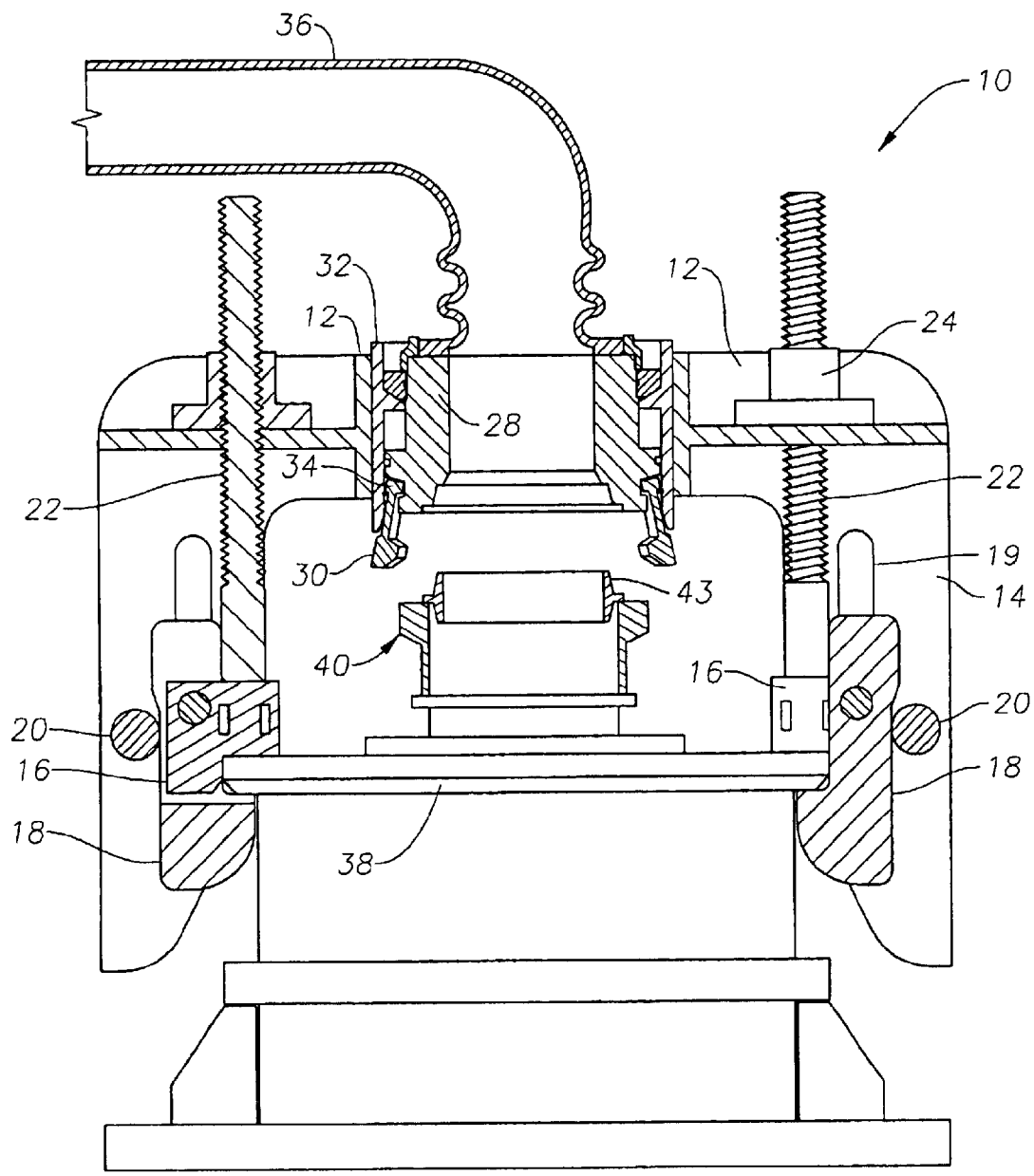
FIG. 6 is a sectional side view of the subsea flowline connector assembly of FIG. 1, the connector assembly frame being lowered partially and locked to the mandrel support.

Connector receptacle 28 will move downward with frame 12 in the initial movement between FIG. 1 and FIG. 6, but still will be spaced above seal 43. Continued rotation of jack screws 22 causes connector receptacle 28 to move from the partially lowered position of FIG. 6 toward a fully locked position of FIG. 7. Connector receptacle 28 contacts mandrel 40 and seal 43. Continued rotation of jack screws 22 after connector receptacle 28 has contacted mandrel 40 causes frame 12 and locking sleeve 32 to lower relative to connector receptacle 28. This causes locking sleeve 32 to cam mandrel dogs 30 inward into engagement with mandrel 40 in a locked position as shown in FIG. 7. Seal 43 will preload and seal between connector receptacle 28 and mandrel 40.

In the event seal 43 must be replaced, this may be done without detaching frame 12 from mandrel support 38. Rotating jack screws 22 the opposite direction to the position shown in FIG. 7 causes connector receptacle 28 to unlock from and disengage mandrel 40. As sleeve 32 raises relative to connector receptacle 28, dogs 30 move back outward to unlock connector receptacle 28 from mandrel 40. In this position frame 12 remains securely attached to mandrel support 38 so that maintenance, such as seal 43 replacement, can be conducted by remotely operated vehicles without requiring that flowline connector assembly 10 be re-aligned with mandrel support 38 and mandrel 40. After such maintenance is performed, jack screws 22 are rotated to a fully lowered position and connector receptacle 28 is again secured to mandrel 40 as described above.

Figure 8:
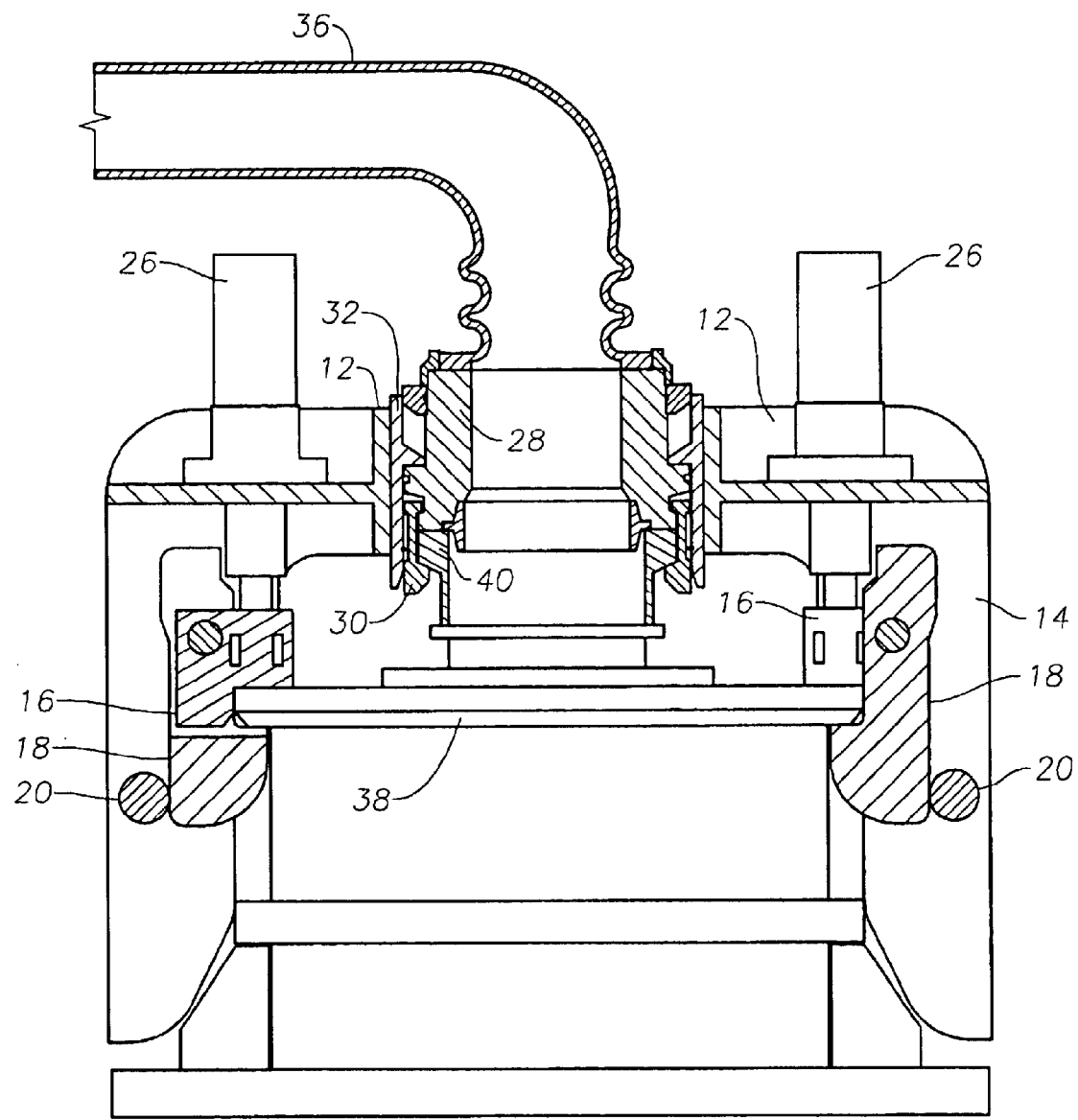
FIG. 8 is a sectional side view of the subsea flowline connector assembly constructed in accordance with this invention, the assembly frame being lowered completely and the connector's receptacle locked to the mandrel, with an alternative lifting means of hydraulic actuators.

In the alternative embodiment of FIG. 8, jack screws 22 are replaced by hydraulic actuators 26. Hydraulic actuators 26 are positioned such that when connector 10 is in the fully engaged position, the piston rods of actuators 26 are not exposed to sea water. Where hydraulic actuators 26 are used instead of jack screws 22, tool 42 is equipped with hydraulic connectors (not shown) that supply hydraulic pressure to each actuator.

While the invention has been shown in only a few of its forms, it should be apparent to those skilled in the art that it is not so limited, but is susceptible to various changes without departing from the scope of the invention. For example, rather than rotating jack screws 22 to raise and lower the frame, the nuts could be rotated. Other locking members rather than dogs could be used.

I claim:

1. A flowline connector assembly for connecting a flowline to a subsea tubular mandrel extending from a support base, comprising:

a frame having an axis;

a landing base carried by the frame for engagement with the support base, the frame being axially movable relative to the landing base from a landed position to a frame locked position and from the frame locked position to a receptacle locked position;

an advancing mechanism that selectively moves the frame between the positions;

a frame latching member movably carried by the landing base and adapted to automatically latch to the support base in response to movement of the frame by the advancing mechanism from the landed position to the frame locked position;

a receptacle adapted to be connected to an end of the flowline, the receptacle being carried by the frame for axial movement relative to the frame and adapted to abut the tubular mandrel as the advancing mechanism moves the frame from the frame locked position toward the receptacle locked position;

a receptacle locking member carried by the receptacle that is radially movable relative to the axis; and a receptacle locking member actuator stationarily carried by the frame in engagement with the receptacle locking member, the receptacle locking member automatically moving the receptacle locking member into locking engagement with the mandrel in response to the advancing mechanism moving the frame from the frame locked position to the receptacle locked position.

2. The flowline connector assembly of claim 1, wherein the frame and the receptacle move in unison as the frame moves from the landed position to the frame locked position.

3. The flowline connector assembly of claim 1, wherein the frame further comprises arms extending from a central support, each arm carrying one of the frame latching members which are pivotally mounted to the arms.

4. The flowline connector assembly of claim 1, wherein the frame latching member is pivotally mounted to the frame; and further comprising:

a frame latching member actuator rigidly mounted to the frame to push the frame latching member inward as the frame moves from the landed position to the frame locked position.

5. The flowline connector assembly of claim 1, wherein the advancing mechanism is a hydraulic actuator.

6. The flowline connector assembly of claim 1, further comprising a resistance mechanism to keep the receptacle locking member actuator in a retracted position relative to the receptacle before the receptacle abuts the mandrel.

7. The flowline connector assembly of claim 1, further comprising a fluid chamber to keep the receptacle locking member actuator in a retracted position relative to the receptacle before the receptacle abuts the mandrel, the receptacle locking member actuator subsequently moving to an advanced position relative to the receptacle when the frame moves from the frame locked position to the receptacle locked position.

8. A flowline connector assembly for connecting a flowline to a subsea tubular mandrel extending from a base, comprising:

a frame having a frame latching member adapted to latch to the base in response to movement of the frame toward the base;

a receptacle adapted to be connected to an end of the flowline, the receptacle being carried by the frame and adapted to abut the tubular mandrel after the latching member latches to the base;

a receptacle locking member that is radially movable relative to an axis with the receptacle and is carried by the receptacle;

a receptacle locking member actuator carried by the receptacle in engagement with the locking member, the receptacle locking member adapted to be moved by the actuator from a released position to a locked position on the mandrel in response to continued movement of the frame toward the base after the receptacle abuts the mandrel;

an advancing mechanism to advance the frame towards the base; and wherein the advancing mechanism is a jack screw.

9. The flowline connector assembly of claim 8, wherein the jack screw has a polygonal end adapted to be rotated by a tool.

10. A flowline connector assembly for connecting a flowline to a subsea tubular mandrel extending from a base, comprising:

a frame having a frame latching member adapted to latch to the base in response to movement of the frame toward the base;

a receptacle adapted to be connected to an end of the flowline, the receptacle being carried by the frame and adapted to abut the tubular mandrel after the latching member latches to the base;

a receptacle locking member that is radially movable relative to an axis with the receptacle and is carried by the receptacle;

a receptacle locking member actuator carried by the receptacle in engagement with the locking member, the receptacle locking member adapted to be moved by the actuator from a released position to a locked position on the mandrel in response to continued movement of the frame toward the base after the receptacle abuts the mandrel; wherein:

the receptacle locking member is a plurality of dogs, each dog pivotally mounted to the receptacle; and the receptacle locking member actuator is a sleeve mounted to the frame and moves down over the dogs to move them to a locked position.

11. A flowline connector assembly for connecting a flowline to a subsea tubular mandrel extending from a base, comprising:

a frame having a frame latching member adapted to latch to the base in response to movement of the frame toward the base;

a receptacle adapted to be connected to an end of the flowline, the receptacle being carried by the frame and adapted to abut the tubular mandrel after the latching member latches to the base a receptacle locking member that is radially movable relative to an axis with the receptacle and is carried by the receptacle;

a receptacle locking member actuator carried by the receptacle in engagement with the locking member, the receptacle locking member adapted to be moved by the actuator from a released position to a locked position on the mandrel in response to continued movement of the frame toward the base after the receptacle abuts the mandrel;

a fluid chamber to keep the receptacle in an advanced position relative to the receptacle locking member actuator before the receptacle abuts the mandrel; and wherein a pressure release valve releases the fluid in the fluid chamber which allows the receptacle to move relative to the receptacle locking member actuator when the receptacle locking member actuator continues to move towards the mandrel after the receptacle abuts the mandrel.

12. A flowline connector assembly for connecting a flowline, comprising:

a base structure located on the sea bed;

a tubular member extending from a surface of the base structure;

a frame having a frame latching member pivotally mounted to the frame;

a receptacle adapted to be connected to an end of the flowline, the receptacle being carried by the frame;

a receptacle locking member that is radially movable relative to an axis with the receptacle and is carried by the receptacle;

a frame latching member actuator rigidly mounted to the frame to push the frame latching member inward as the frame moves axially relative to the frame latching member;

a receptacle locking member actuator carried by the receptacle in engagement with the receptacle locking member; and at least one lowering mechanism having a landing base and mounted to the frame for lowering the frame relative to the landing base after the landing base lands on the base structure, the frame latching member moving to an engaged position with the base structure in response to the lowering movement of the frame relative to the landing base after the landing base lands on the base structure wherein continued lowering movement of the frame by the lowering mechanism after the frame latching member engages the base structure causes the receptacle to land on the tubular member, and wherein after the receptacle lands on the tubular member, the receptacle locking member actuator move the receptacle locking member into an engaged position with the tubular member in response to continued lowering movement of the frame by the lowering mechanism.

13. The flowline connector assembly of claim 12, wherein the lowering mechanism is a hydraulic actuator.

14. The flowline connector assembly of claim 12, further comprising a fluid chamber to keep the receptacle locking member actuator in a retracted position relative to the receptacle locking member before the receptacle abuts the tubular member.

15. A flowline connector assembly for connecting a flowline, comprising:

a base structure located on the sea bed;

a tubular member extending from a surface of the base structure;

a frame having a frame latching member pivotally mounted to the frame which latches to the base in response to movement of the frame toward the base structure;

a receptacle adapted to be connected to an end of the flowline, the receptacle being carried by the frame and abuts the tubular member after the latching member latches to the base structure;

a receptacle locking member that is radially movable relative to an axis with the receptacle and is carried by the receptacle;

a frame latching member actuator rigidly mounted to the frame to push the frame latching member inward as the frame moves axially relative to the frame latching member;

a receptacle locking member actuator carried by the receptacle in engagement with the locking member, the actuator moving the receptacle locking member from a released position to a locked position on the tubular member in response to continued movement of the frame toward the base after the receptacle abuts the tubular member;

at least one lowering mechanism extending from an end of the frame which lands on the base structure to an opposite end of the frame, while engaged with the base structure, the lowering mechanism lowers the frame and the receptacle to the base structure, which causes the frame latching member actuator to actuate the frame latching members to latch to the base structure; and wherein the frame further comprises a slot, and the frame latching member is pivotally mounted to a member that slidingly engages the slot, allowing the frame latching member to move relative to the frame as the frame advances toward the tubular member.

16. A flowline connector assembly for connecting a flowline, comprising:

a base structure located on the sea bed;

a tubular member extending from a surface of the base structure;

a frame having a frame latching member pivotally mounted to the frame which latches to the base in response to movement of the frame toward the base structure;

a receptacle adapted to be connected to an end of the flowline, the receptacle being carried by the frame and abuts the tubular member after the latching member latches to the base structure;

a receptacle locking member that is radially movable relative to an axis with the receptacle and is carried by the receptacle;

a frame latching member actuator rigidly mounted to the frame to push the frame latching member inward as the frame moves axially relative to the frame latching member;

a receptacle locking member actuator carried by the receptacle in engagement with the locking member, the actuator moving the receptacle locking member from a released position to a locked position on the tubular member in response to continued movement of the frame toward the base after the receptacle abuts the tubular member;

at least one lowering mechanism extending from an end of the frame which lands on the base structure to an opposite end of the frame, while engaged with the base structure, the lowering mechanism lowers the frame and the receptacle to the base structure, which causes the frame latching member actuator to actuate the frame latching members to latch to the base structure; and wherein the frame latching member has a shoulder located towards its upper end which is engaged by the frame latching member actuator to rotate the latching member radially outward.

17. A flowline connector assembly for connecting a flowline, comprising:

a base structure located on the sea bed;

a tubular member extending from a surface of the base structure;

a frame having a frame latching member pivotally mounted to the frame which latches to the base in response to movement of the frame toward the base structure;

a receptacle adapted to be connected to an end of the flowline, the receptacle being carried by the frame and abuts the tubular member after the latching member latches to the base structure;

a receptacle locking member that is radially movable relative to an axis with the receptacle and is carried by the receptacle;

a frame latching member actuator rigidly mounted to the frame to push the frame latching member inward as the frame moves axially relative to the frame latching member;

a receptacle locking member actuator carried by the receptacle in engagement with the locking member, the actuator moving the receptacle locking member from a released position to a locked position on the tubular member in response to continued movement of the frame toward the base after the receptacle abuts the tubular member;

at least one lowering mechanism extending from an end of the frame which lands on the base structure to an opposite end of the frame, while engaged with the base structure, the lowering mechanism lowers the frame and the receptacle to the base structure, which causes the frame latching member actuator to actuate the frame latching members to latch to the base structure; and wherein the lowering mechanism is a jack screw having a polygonal end adapted to be rotated by a tool.

18. A flowline connector assembly for connecting a flowline, comprising:

a base structure located on the sea bed;

a tubular member extending from a surface of the base structure;

a frame having a frame latching member pivotally mounted to the frame which latches to the base in response to movement of the frame toward the base structure;

a receptacle adapted to be connected to an end of the flowline, the receptacle being carried by the frame and abuts the tubular member after the latching member latches to the base structure;

a receptacle locking member that is radially movable relative to an axis with the receptacle and is carried by the receptacle;

a frame latching member actuator rigidly mounted to the frame to push the frame latching member inward as the frame moves axially relative to the frame latching member;

a receptacle locking member actuator carried by the receptacle in engagement with the locking member, the actuator moving the receptacle locking member from a released position to a locked position on the tubular member in response to continued movement of the frame toward the base after the receptacle abuts the tubular member;

at least one lowering mechanism extending from an end of the frame which lands on the base structure to an opposite end of the frame, while engaged with the base structure, the lowering mechanism lowers the frame and the receptacle to the base structure, which causes the frame latching member actuator to actuate the frame latching members to latch to the base structure wherein:

the receptacle locking member is a plurality of dogs, each dog pivotally mounted to receptacle; and receptacle locking member actuator is a sleeve mounted to the frame and moves down over the dogs to move them to a locked position.

19. A method for connecting a flowline to a mandrel extending from a base, comprising the following steps:

(a) providing a frame with a latch, a receptacle mounted to the frame, the receptacle having a locking member;

(b) engaging the frame with the base; then (c) advancing the frame toward the base to cause the latch to latch the frame to the base; then (d) continuing to advance the frame toward the base to cause the receptacle to abut the mandrel; and then (e) continuing to advance the frame toward the base to cause the locking member to lock the receptacle to the mandrel.

20. The method of claim 19, wherein the method also includes disengaging the receptacle from the mandrel after step (c), comprising:

moving the frame in a direction away from the base to a first position, thereby causing the locking member to release from the mandrel and the receptacle to move away from the mandrel, and stopping movement of the frame away from the base before the latch releases the frame from the base.

21. The method of claim 19, wherein the method also includes installing a seal ring between the receptacle and the mandrel before step (d), and causing the seal ring to seal between the mandrel and the receptacle in step (d).

22. The method of claim 19, wherein step (c) is performed by a latch member actuator pushing inward on the latch in response to movement of the frame toward the base.

23. The method of claim 19, where step (e) is performed by a locking actuator pushing inward on the locking member in response to movement of the frame toward the base.

* * * * *

UNITED STATES PATENT AND TRADEMARK OFFICE
CERTIFICATE OF CORRECTION

PATENT NO. : 6,805,382 B2
DATED : October 19, 2004
INVENTOR(S) : Charles Edward Jennings It is certified that error appears in the above-identified patent and that said Letters Patent is hereby corrected as shown below:

Column 1,
Line 52, delete "fluorine" and insert -- flowline --

Column 3,
Line 21, insert -- is -- after "27"
Lines 56 and 57, delete "filly" and insert -- fully --

Column 7,
Line 29, delete "move" and insert -- moves --

Column 10,
Line 14, insert -- the -- before "receptacle"

Signed and Sealed this

Fifteenth Day of March, 2005

JON W. DUDAS
*Director of the United States Patent and Trademark Office*